(12) United States Patent
Lee

(10) Patent No.: US 8,848,151 B2
(45) Date of Patent: Sep. 30, 2014

(54) LIQUID CRYSTAL DISPLAY DEVICE

(75) Inventor: Do Young Lee, Seoul (KR)

(73) Assignee: LG Display Co., Ltd., Seoul (KR)

(*) Notice: Subject to any disclaimer, the term of this patent is extended or adjusted under 35 U.S.C. 154(b) by 985 days.

(21) Appl. No.: 12/899,306

(22) Filed: Oct. 6, 2010

(65) Prior Publication Data

US 2011/0018790 A1 Jan. 27, 2011

Related U.S. Application Data

(62) Division of application No. 11/638,519, filed on Dec. 14, 2006, now Pat. No. 7,812,910.

(30) Foreign Application Priority Data

Dec. 14, 2005 (KR) .............................. P2005-123064

(51) Int. Cl.
*G02F 1/1343* (2006.01)
*G02F 1/1362* (2006.01)
*G02F 1/136* (2006.01)

(52) U.S. Cl.
CPC *G02F 1/136286* (2013.01); *G02F 2001/13606* (2013.01); *G02F 1/134363* (2013.01)
USPC ............................. 349/143; 349/141; 349/142

(58) Field of Classification Search
CPC .................... G09G 2310/0248; G09G 3/3614; G09G 3/3648; G09G 2310/027
USPC .................................................. 349/141–143
See application file for complete search history.

(56) References Cited

U.S. PATENT DOCUMENTS

| 6,525,798 | B1 | 2/2003 | Yamakita et al. |
| 6,573,881 | B1 * | 6/2003 | Kwon .............................. 345/92 |
| 6,657,699 | B2 | 12/2003 | Matsumoto |
| 6,791,652 | B2 | 9/2004 | Yang et al. |

(Continued)

FOREIGN PATENT DOCUMENTS

| CN | 1677476 A | 10/2005 |
| JP | 11-344725 | 12/1999 |

(Continued)

OTHER PUBLICATIONS

Office Action issued Oct. 6, 2009 in corresponding Japanese Application No. 2006-337100.

(Continued)

*Primary Examiner* — Huyen Ngo
(74) *Attorney, Agent, or Firm* — Morgan, Lewis & Bockius LLP

(57) ABSTRACT

A liquid crystal display device includes gate and data lines on a first substrate, wherein the gate lines cross the data lines to define sub-pixels, a thin film transistor to where the gate lines cross the data lines, a pixel electrode connected to the thin film transistor, a common electrode in a first sub pixel, wherein a first parasitic capacitance between a first data line arranged at the left side of the first sub-pixel and the common electrode is smaller than a second parasitic capacitance between a second data line arranged at the right side of the first sub-pixel and the common electrode; and a second substrate bonded to the first substrate with a layer of liquid crystal molecules therebetween, wherein the pixel electrode overlaps the common electrode and has a plurality of slits.

6 Claims, 7 Drawing Sheets

(56) References Cited

U.S. PATENT DOCUMENTS

| | | |
|---|---|---|
| 6,876,420 B2 | 4/2005 | Hong et al. |
| 6,982,692 B2 * | 1/2006 | Kim .............................. 345/96 |
| 7,522,147 B2 * | 4/2009 | Lin et al. ...................... 345/100 |
| 7,545,448 B2 * | 6/2009 | Wu ................................ 349/34 |
| 2001/0046002 A1 * | 11/2001 | Lin et al. ........................ 349/43 |
| 2002/0018166 A1 | 2/2002 | Matsumoto et al. |
| 2002/0044247 A1 * | 4/2002 | Ko et al. ...................... 349/141 |

FOREIGN PATENT DOCUMENTS

| | | |
|---|---|---|
| JP | 2000-29073 | 1/2000 |
| JP | 2001-56476 A | 2/2001 |
| JP | 2002-72250 | 3/2002 |
| JP | 2002-287712 | 10/2002 |
| JP | 2004-86226 | 3/2004 |
| KR | 10-2001-0040114 A | 5/2001 |
| KR | 10-2002-0015001 A | 2/2002 |
| KR | 10-2002-0029554 A | 4/2002 |

OTHER PUBLICATIONS

Japanese Office Action in counterpart Japanese patent application, dated Jun. 1, 2010.

Office Action issued Feb. 16, 2010 in corresponding Japanese Application No. 2006-337100.

* cited by examiner

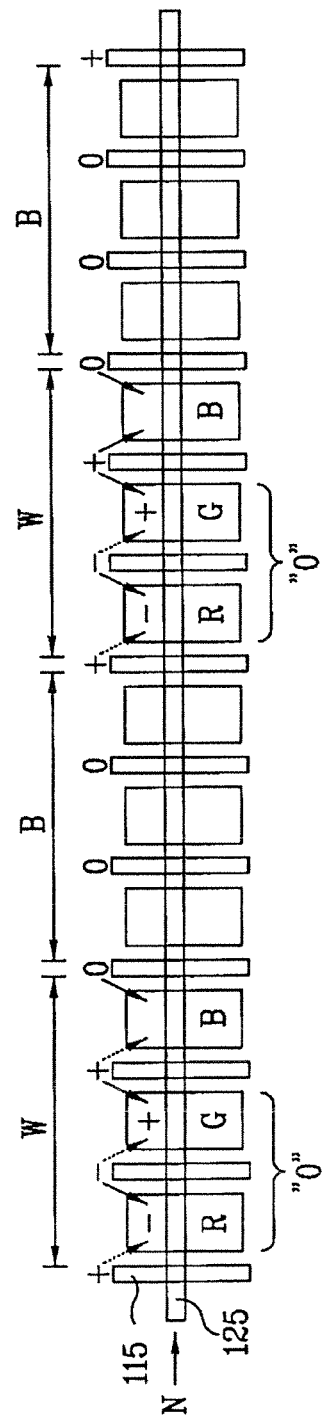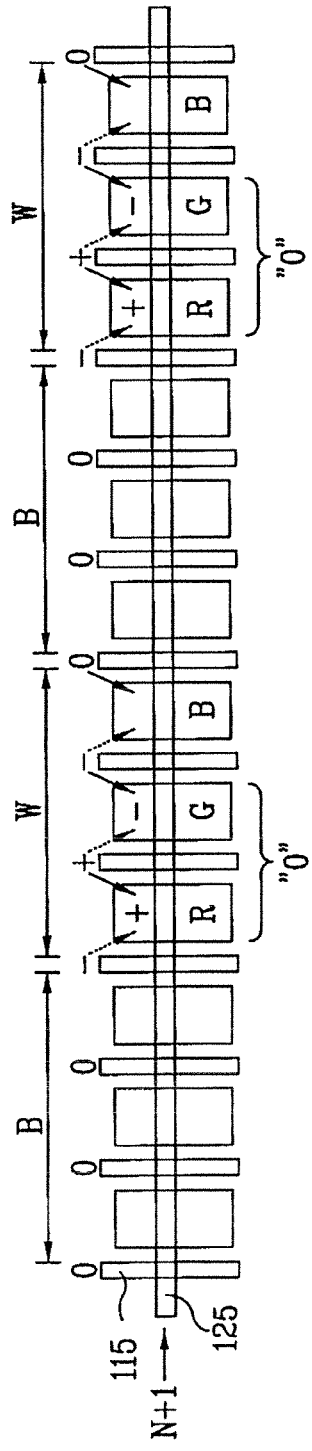

LIQUID CRYSTAL DISPLAY DEVICE

This application is a divisional application of U.S. application Ser. No. 11/638,519, filed on Dec. 14, 2006, and claims the benefit of the Korean Patent Application No. 10-2005-123064, filed on Dec. 14, 2005, which are hereby incorporated by reference in their entirety.

BACKGROUND OF THE INVENTION

1. Field of the Invention

Embodiments of the invention relate to a display device, and more particularly to a liquid crystal display (LCD) device.

2. Discussion of the Related Art

Recently, active matrix LCD devices are widely used in flat TVs, portable computers, monitors, and so on due to their performance capabilities, such as high speed, high contrast and high resolution. Among the active matrix LCD devices, a twisted nematic (TN) mode LCD device is typically used. The TN mode LCD device drives a liquid crystal director twisted at an angle 90° by applying a voltage to two electrodes respectively arranged on two substrates. The TN mode LCD device provides excellent contrast and color reproduction but has a narrow viewing angle.

To solve the problem of narrow viewing angle in the TN mode LCD device, an in-plane switching (IPS) mode LCD device has been developed in which two electrodes are formed on one substrate and a liquid crystal director is controlled by a horizontal electric field generated between the two electrodes. However, the (IPS) mode LCD device has a low aperture ratio and poor transmittance. To improve aperture ratio and transmittance of the IPS mode, a fringe field switching (FFS) mode LCD device has been developed in which a relative electrode and a pixel electrode are positioned such that a liquid crystal director is controlled by a fringe electric field formed between the relative electrode and the pixel electrode.

FIG. 1 is a plan view illustrating a related art IPS mode LCD device, FIG. 2 is a cross-sectional view taken along line I-I' of FIG. 1, FIG. 3 is a plan view illustrating an LCD device driven in a checkerboard pattern, FIG. 4 is a plan view illustrating an LCD device driven in a vertical pattern, FIGS. 5A and 5B illustrate driving of a checkerboard pattern according to the related art, and FIGS. 6A and 6B are timing diagrams illustrating driving of a checkerboard pattern according to the related art.

The related art IPS mode LCD device includes a thin film transistor (TFT) array substrate, a color filter array substrate, and a liquid crystal layer. The TFT array substrate and the color filter array substrate are bonded to each other with a layer of liquid crystal molecules interposed between the two array substrates. As show in FIGS. 1 and 2, the TFT array substrate 11 includes gate lines 12, data lines 15, and thin film transistors. The gate lines 12 vertically cross the data lines 25 to define sub-pixels. Each of the thin film transistors is arranged adjacent to where gate lines 12 and data lines 15 cross. A passivation layer 16 is formed over the TFT array, including the thin film transistors.

Each sub-pixel includes common lines 25, a plurality of common electrodes 24, and a plurality of pixel electrodes 17. The common lines are arranged in parallel with the gate lines 12. The common electrodes 24 extend from the common lines 25 and are arranged in parallel with the data lines 15. The pixel electrodes 17 and the common electrodes 24 are alternately arranged in parallel. The pixel electrodes 17 are connected to the thin film transistors. When a signal Vcom is transmitted to the common electrode 24 and a signal Vdata passing through the thin film transistor is transmitted to the pixel electrode 17, a horizontal electric field E is generated. However, parasitic capacitance Cdc may occur between the data line 15 and the common electrode 24 located in the outmost corner of the sub-pixel.

The color filter array substrate includes red (R), green (G) and blue (B) color filter layers arranged at constant intervals to display colors. A black matrix layer divides R, G and B cells from one another and shields light. The respective R, G, and B color filter layers are formed to collectively correspond to the pixels so that each pixel has at least R, G, and B color sub-pixels. Typically, the sub-pixels having R, G, and B colors are driven independently. A color of one pixel is displayed by combination of the R, G, and B sub-pixels.

The R, G, and B color filter layers are positioned depending on their arrangement method, such as a stripe arrangement, a mosaic arrangement, a delta arrangement, and a quad arrangement. The stripe arrangement, as shown in FIGS. 3 and 4, is when the R, G, and B color filter layers are sequentially arranged in a horizontal direction so as to have the same colors arranged in a vertical direction. The R, G, and B sub-pixels of the aforementioned related art LCD device are all turned on/off to display black (B) or white (W) so as to check picture quality characteristics, such as residual images, flicker, and green tint.

As shown in FIG. 3, the LCD device may be driven in a checkerboard pattern in which an Nth turned-on pixel and an N+1th turned-on pixel are separated by at least one pixel within a line and are offset with respect to turned-on pixels of another line. As shown in FIG. 4, the LCD device may be driven in a vertical pattern in which an Nth turned-on pixel and an N+1th turned-on pixel are arranged at the same position for each line in a vertical direction and are separated by at least one pixel within a line.

In a case where the LCD device is driven in the checkerboard pattern, as shown in FIGS. 5A and 5B, voltages of positive polarity (+) and negative polarity (−) are applied in a horizontal direction by a dot inversion mode and the voltages are applied in a vertical direction by the dot inversion mode through the data line 15. At this time, the LCD device is driven so that white (W) and black (B) of the Nth line are opposite to white (W) and black (B) of the N+1th line in a vertical direction.

Voltages are applied through the data line 15 and the common electrode 24 to turn-on and turn-off sub-pixels. For example, a data voltage Vdata is applied to the Nth line in such a manner that voltages of positive polarity (+) and negative polarity (−) are applied by an alternating current (AC) and levels of the data voltage are varied to display black and white while a common voltage Vcom1 is applied to the Nth line by a direct current (DC). The layer of liquid crystal molecules is driven by the potential difference between the data voltage Vdata on the pixel electrode 17 and the common voltage Vcom1 on the common electrode 24.

As shown in FIGS. 5A and 6A, voltages of high level sequentially having positive polarity (+), negative polarity (−), and positive polarity (+) are applied to the Nth line by a dot inversion mode with respect to R, G, and B sub-pixels so as to display white. On the other hand, either voltage of low level or no voltage is applied to the Nth line by a dot inversion mode with respect to R, G, and B sub-pixels so as to display black.

As shown in FIGS. 5B and 6B, voltages of high level sequentially having positive polarity (+), negative polarity (−), and positive polarity (+) are applied to the N+1th line by a dot inversion mode with respect to R, G, and B sub-pixels so as to display white. On the other hand, either voltages of low level or no voltages are applied to the N+1th line by a dot inversion mode with respect to R, G, and B sub-pixels so as to display black.

The polarity of the data voltage applied to the Nth line is opposite to the polarity of the data voltage applied to the N+1th line in the dot inversion mode. If the data voltage is applied by a two-dot inversion mode, polarity of the data voltage is opposite to the polarity of the data voltage every two lines. For example, the data voltage Vdata of positive polarity (+), negative polarity (−), and positive polarity (+) is applied to the R, G, and B sub-pixels of the Nth and N+1th lines while the data voltage Vdata of negative polarity (−), positive polarity (+), and negative polarity (−) is applied to the R, G, and B sub-pixels of the N+2th and N+3th lines.

The related art LCD device has several problems. When the data voltage Vdata is applied to the Nth line by an AC voltage and the common voltage Vcom1 is also applied thereto by a DC voltage, fluctuation of the common voltage is amplified between the data line 15 and its adjacent common electrode 24 due to interference from the parasitic capacitance Cdc of a coupling between the data voltage Vdata and the common voltage Vcom1. Thus, as shown in FIGS. 6A and 6B, coupling occurs in which the common voltage Vcom1 becomes the common voltage Vcom2, which can be either higher or lower than the actual applied common voltage Vcom1.

As shown in FIG. 5A, in the R sub-pixel of the Nth line, a coupling can be generated between the common electrode and the left data line. More specifically, the common electrode is connected with the common line 25 that carries the common voltage Vcom1 and the left data line 15 carries the data voltage Vdata of positive polarity (+) that creates a coupling that offsets a coupling generated between the common electrode and the right data line, which carries the data voltage having a negative polarity (−). In the G sub-pixel of the Nth line, a coupling generated between the common electrode and the left data line, which carries a data voltage having a negative polarity (−), is offset by a coupling generated between the common electrode and the right data line, which carries a data voltage of positive polarity (+). However, in the B sub-pixel of the Nth line, a coupling is generated between the common electrode and the left data line, where carries a data voltage of positive polarity (+), but an offset coupling is not generated between the common electrode and the right data line, which carries a reference voltage flows (0). As a result, in the B sub-pixel of the Nth line, a sufficient offset coupling is not obtained due to the data voltage of positive polarity (+) through the left data line that is not offset.

Fluctuations of the common voltage are amplified in the Nth line due to the non-offset coupling of the Nth line in the B sub-pixel. Thus, as shown in FIG. 6A, the common voltage Vcom1 is amplified to a more positive polarity (+) and the Vcom1 become a common voltage Vcom2. When the Vcom2 flowing in the common line becomes higher than the applied common DC voltage Vcom1 due to the non-offset coupling, the voltage difference V2 between the voltages Vdata and Vcom2 applied to the G sub-pixel becomes greater than the voltage difference V1 between the voltages Vdata and Vcom2 applied to the R and B sub-pixels. In this case, a greenish phenomenon occurs in which green is brighter than it should be. This is because rotation of the liquid crystal molecules increases to more strongly display a color as the voltage difference increases.

By contrast, in case of the N+1th line, as shown in FIG. 5B, coupling generated in the R and G sub-pixels is offset but a coupling generated in the B sub-pixel remain due to the data voltage of negative polarity (−) through the left data line. As a result, fluctuation of the common voltage is amplified in the N+1th line due to the non-offset coupling generated in the B sub-pixel. Thus, as shown in FIG. 6B, the Vcom1 is amplified toward a more negative polarity (−) and the Vcom1 become a common voltage Vcom2. When the Vcom2 flowing in the common line becomes lower than the applied common DC voltage Vcom1 due to the non-offset coupling, the voltage difference V4 between the voltages Vdata and Vcom2 applied to the G sub-pixel becomes greater than the voltage difference V4 between the voltages Vdata and Vcom2 applied to the R and B sub-pixels. In this case, a greenish phenomenon occurs in which green is brighter than is should be.

SUMMARY OF THE INVENTION

Accordingly, embodiments of the invention are directed to an LCD device that substantially obviates one or more problems due to limitations and disadvantages of the related art.

An object of embodiments of the invention is to provide an LCD device that prevents a greenish phenomenon from occurring.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device includes gate and data lines on a first substrate, wherein the gate lines cross the data lines to define sub-pixels, thin film transistors adjacent to where the gate lines cross the data lines, pixel electrodes connected to the thin film transistors, common electrodes at left and right sides of the sub-pixels, wherein a first parasitic capacitance between a first data line arranged at the left side of a first sub-pixel and an adjacent first common electrode is smaller than a second parasitic capacitance between a second data line arranged at the right side of the first sub-pixel and an adjacent second common electrode, and a second substrate bonded to the first substrate with a layer of liquid crystal molecules therebetween.

In another aspect, a liquid crystal display device includes gate and data lines on a first substrate to define sub-pixels, thin film transistors adjacent to where the gate lines cross the data lines, pixel electrodes connected to the thin film transistors, common electrodes at left and right sides of the sub-pixels, wherein a first parasitic capacitance between a first data line arranged at the left side of a first sub-pixel and an adjacent first common electrode is different from a second parasitic capacitance between a second data line arranged at the right side of the first sub-pixel and an adjacent second common electrode, and a second substrate bonded to the first substrate with a layer of liquid crystal molecules therebetween.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

Figures 3, 4:
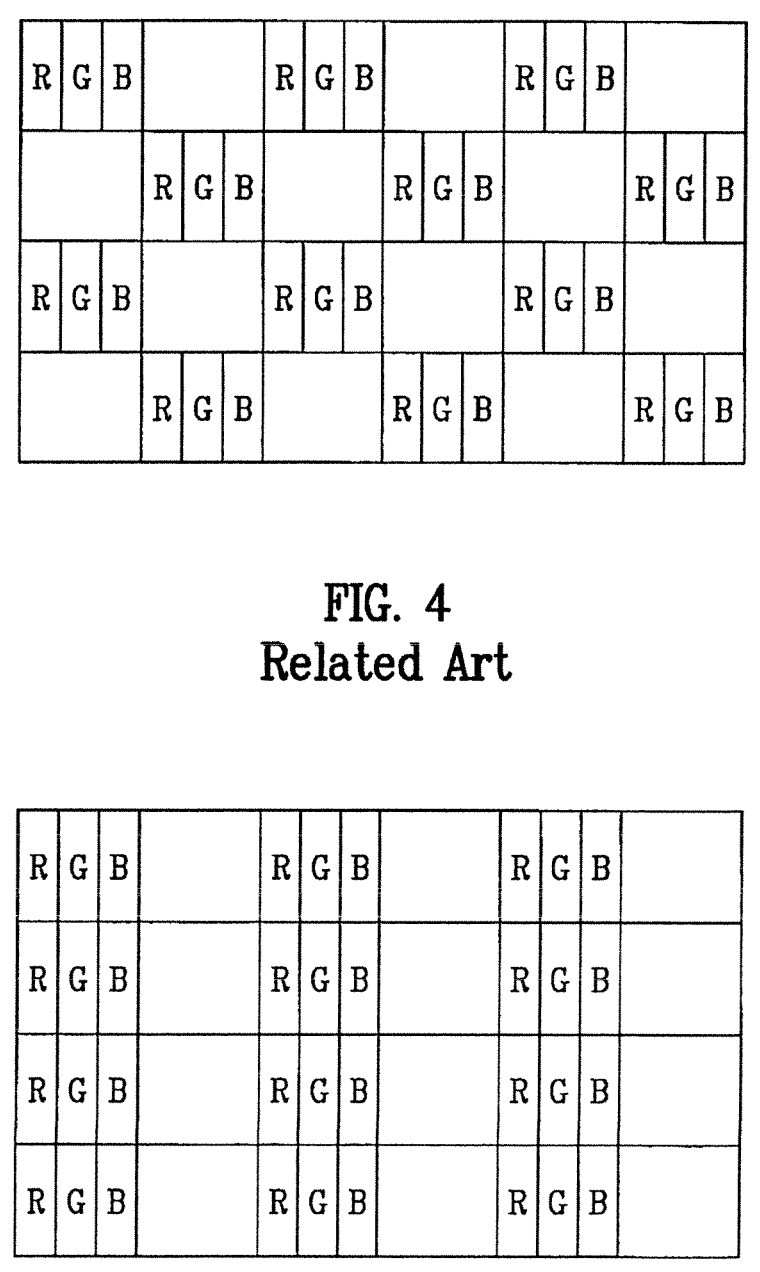

FIG. 3 is a plan view illustrating an LCD device driven in a checkerboard pattern;

FIG. 4 is a plan view illustrating an LCD device driven in a vertical pattern;

FIGS. 11A and 11B illustrate driving of a checkerboard pattern according to an embodiment of the invention.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
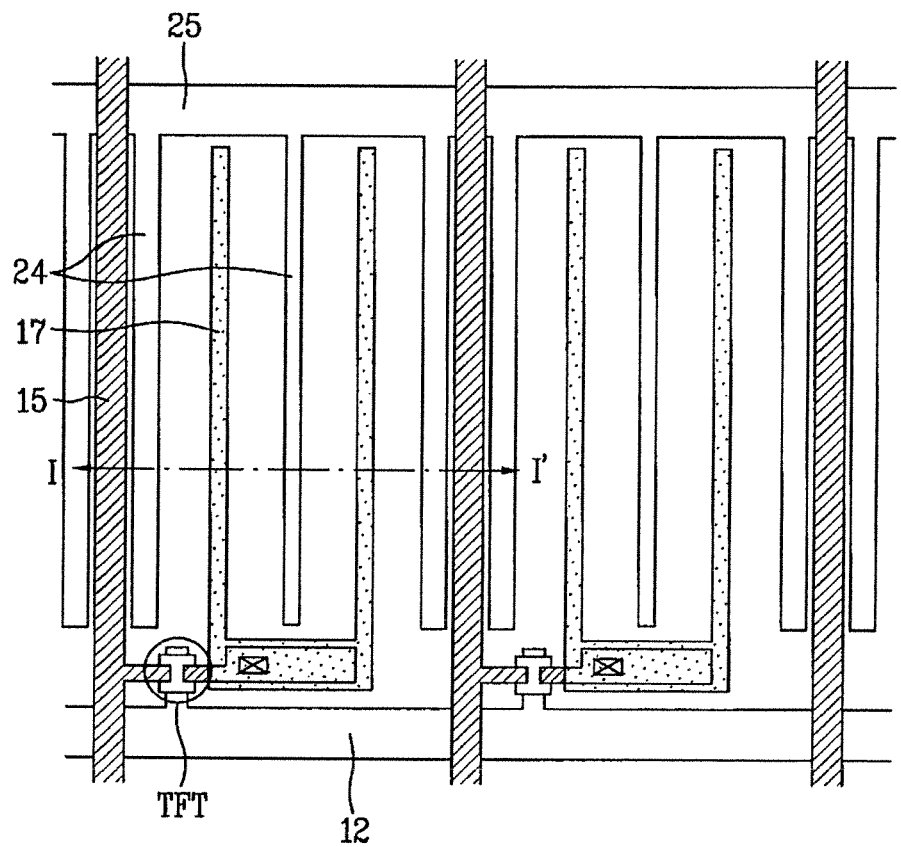
FIG. 1 is a plan view illustrating the related art IPS mode LCD device.
Figure 2:
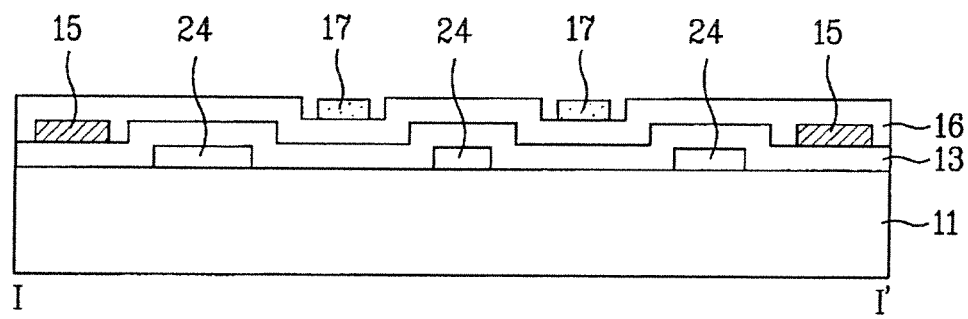
FIG. 2 is a cross-sectional view taken along line I-I' of FIG. 1.
Figure 5A:
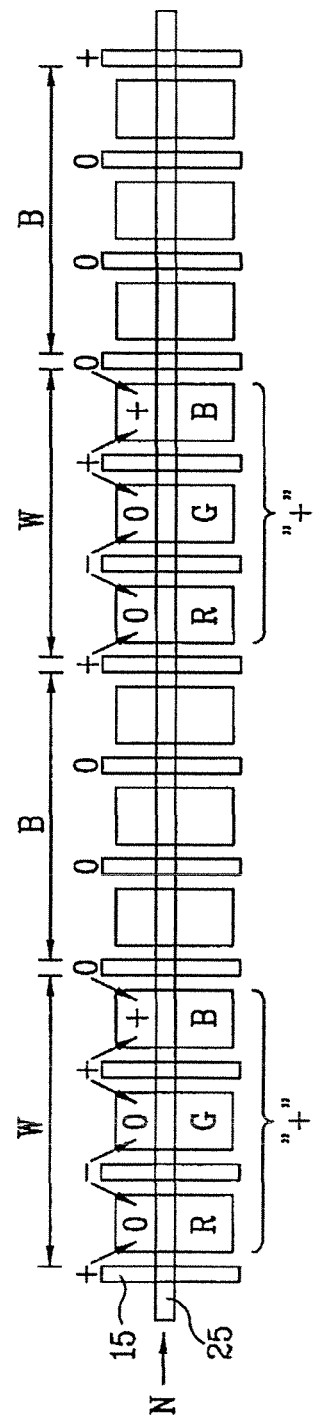
FIGS. 5A and 5B illustrate driving of a checkerboard pattern according to the related art.
Figure 5B:
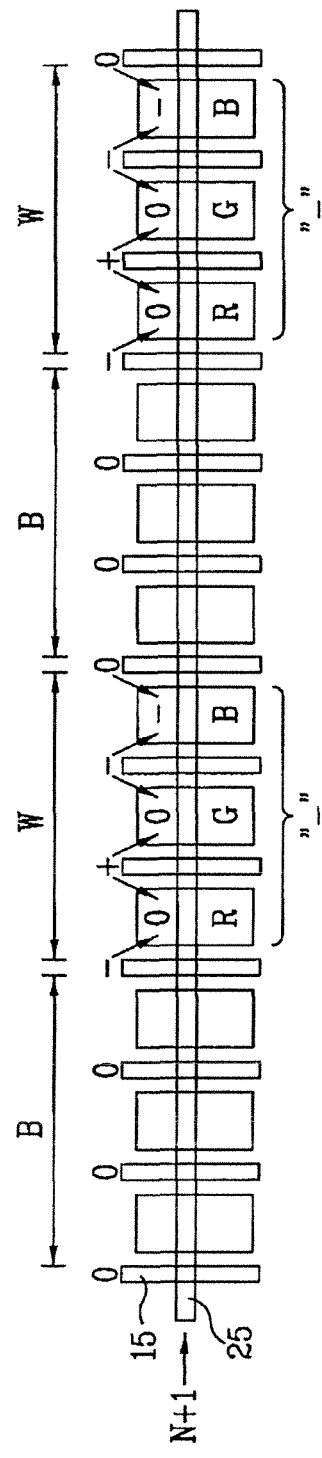
Figure 6A:
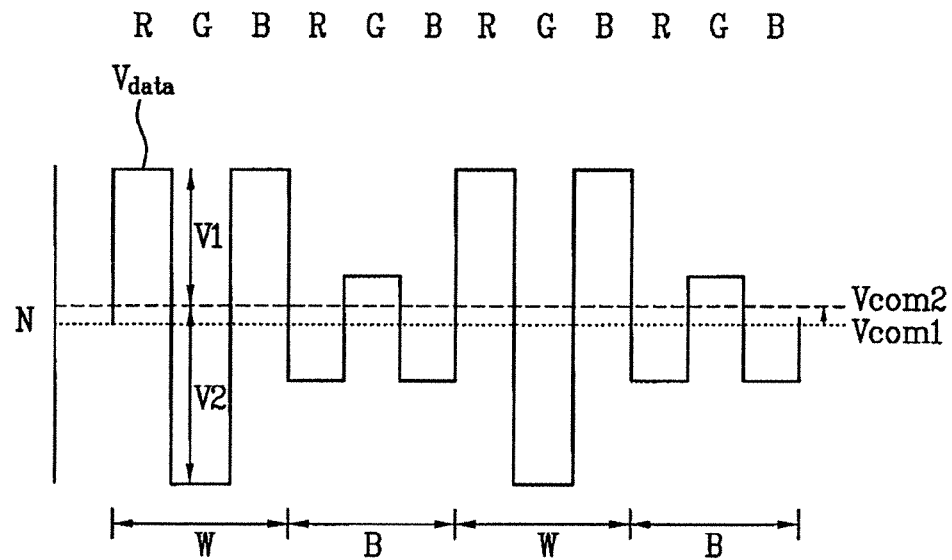
FIGS. 6A and 6B are timing diagrams illustrating driving of a checkerboard pattern according to the related art.
Figure 6B:
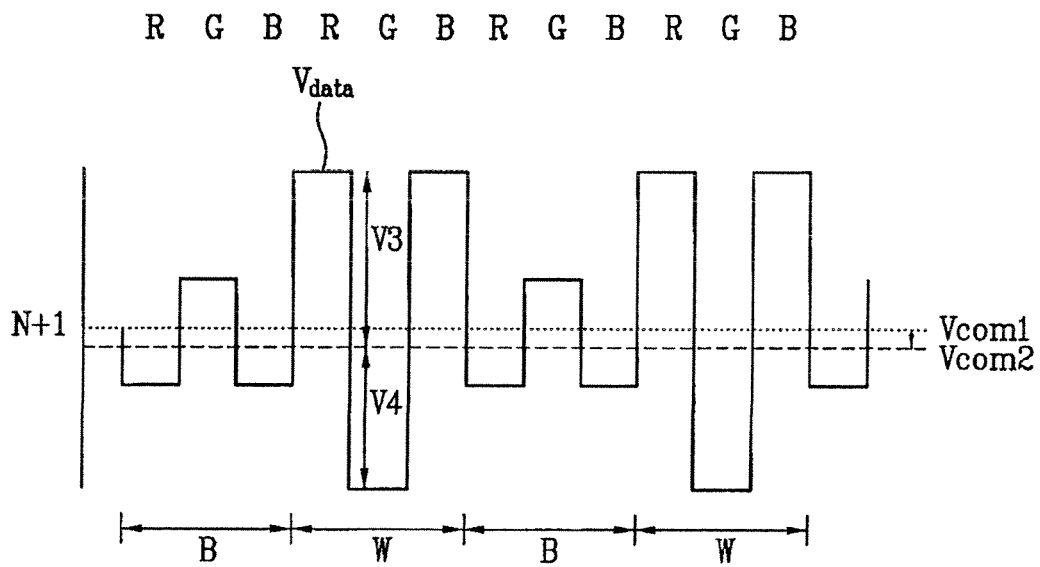
Figure 7:
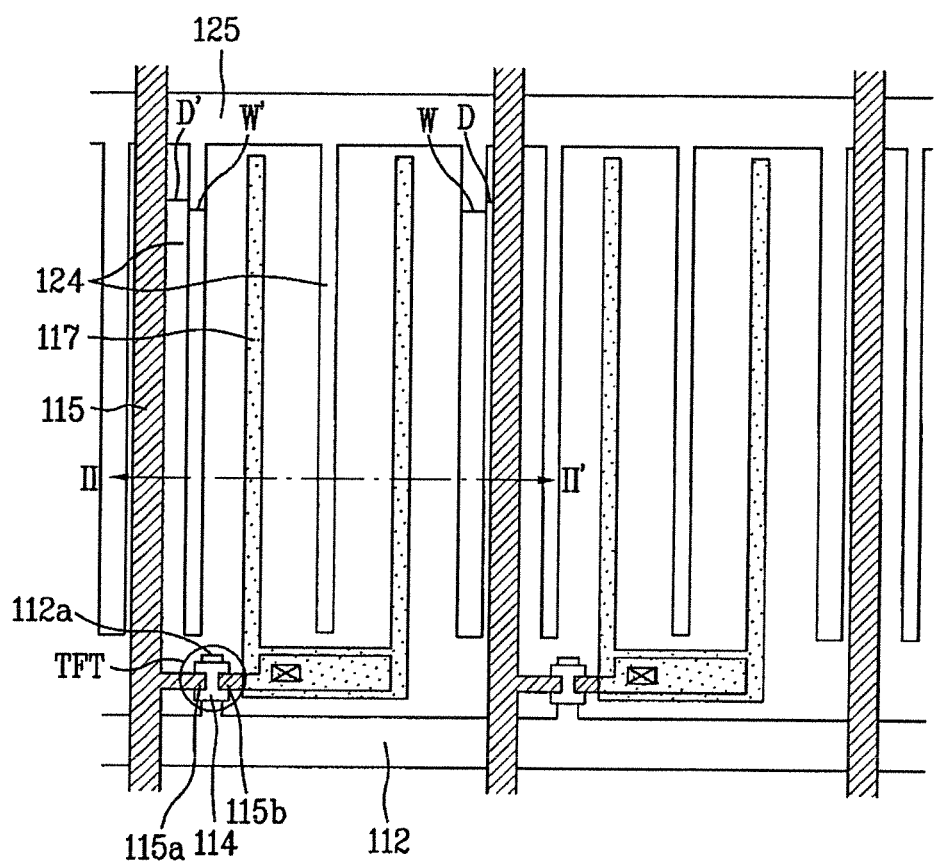
FIG. 7 is a plan view illustrating an IPS mode LCD device according to an embodiment of the invention.
Figure 8:
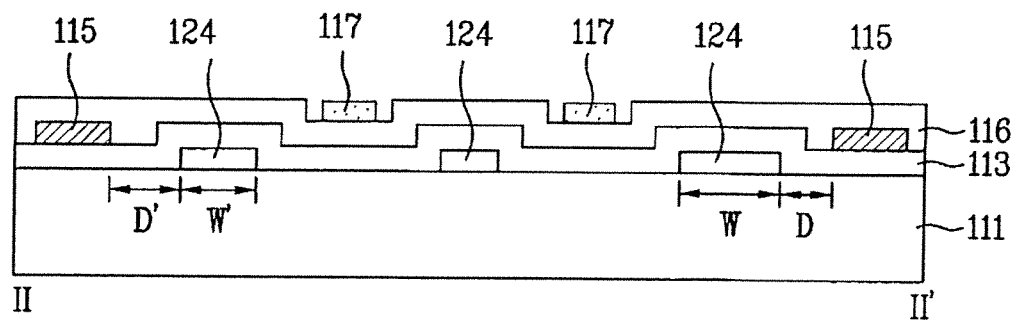
FIG. 8 is a cross-sectional view taken along line II-II' of FIG. 7.

FIG. 7 is a plan view illustrating an IPS mode LCD device according to an embodiment of the invention, and FIG. 8 is a cross-sectional view taken along line II-II' of FIG. 7. As shown in FIGS. 7 and 8, a thin film transistor array substrate 111 of an IPS mode LCD device according to an embodiment of the invention includes gate lines 112 arranged in a row, data lines 115 vertically crossing the gate lines 112 to define R, G, and B sub-pixels, thin film transistors formed adjacent to where the gate lines 112 cross the data lines 115, common lines 125 arranged in parallel with the gate lines 112, a plurality of common electrodes 124 connected with the common lines 125 and formed inside the sub-pixels, and pixel electrodes 117 contacting drain electrodes 115b of the thin film transistors and formed in parallel with the common electrodes 124 to generate an horizontal electric field E. The common electrodes 124 arranged at left and right sides of the sub-pixels have different widths so as to make their respective parasitic capacitance Cdc different such that the parasitic capacitances Cdc at the left and right sides of the sub-pixels have different values.

The width W' of the common electrode 124 arranged at the left side of the sub-pixel is smaller than the width W of the common electrode 124 arranged at the right side of the sub-pixel so that the parasitic capacitances Cdc at the left and right sides of the sub-pixel are different from each other. More specifically, the parasitic capacitance Cdc between the data line 115 arranged at the right side of the sub-pixel and its adjacent common electrode 124 is greater than the parasitic capacitance Cdc between the data line 115 arranged at the left side of the sub-pixel and its adjacent common electrode 124. By increasing the parasitic capacitance Cdc between the data line 115 arranged at the right side of the sub-pixel and its adjacent common electrode 124, sufficient offset coupling can be obtained in each sub-pixel such that a data common voltage is not amplified.

In the alternative, different parasitic capacitances Cdc at the left and right sides of the sub-pixel can be generated by common electrodes arranged at the left and right sides of the sub-pixel having uniform widths but the distance between a data line and its adjacent common electrode arranged at the left and right sides of the sub-pixel is different. In other words, the distance D' between the data line and its adjacent common electrode arranged at the left side of the sub-pixel is greater than the distance D between the data line and its adjacent common electrode arranged at the right side of the sub-pixel while both data lines have the same width. In yet another alternative, different parasitic capacitances at the left and right sides of the sub-pixel can be obtained bye common electrodes having different widths and at different distances from their adjacent common electrode.

Each of the thin film transistors includes a gate electrode 112a diverged from the gate line 112, a gate insulating layer 113 formed on the entire surface including the gate electrode 112a, a semiconductor layer 114 formed on the gate insulating layer 113 above the gate electrode 112a, and source and drain electrodes 115a and 115b respectively formed at both ends of the semiconductor layer 114. The source electrodes 115a is diverged from the data line 115. The pixel electrodes 117 and the common electrodes 124 are alternately formed in the sub-pixel to form an horizontal electric field E. The common electrodes 124 are connected electrically with the common line 125 to receive a signal Vcom from the common line 125 and the pixel electrodes 117 are connected electrically with the drain electrode 115b to receive a signal Vdata from the drain electrode 115b.

The gate insulating layer 113 is also interposed between the gate and data lines 112 and 115 to insulate the gate and data lines 112 and 115 from each other. A passivation layer is interposed between the data line and the pixel electrode to insulate the data line and the pixel electrode from each other. The common line 125 and the common electrode 124 can be formed in the same layer as the gate line 112.

In the alternative, the common line 125 can be formed in the same layer as the gate line 112 while the common electrode can be formed in the same layer as the pixel electrode. In this case, the common electrode provided at the left and right sides of the sub-pixel is formed in the same layer as the gate line. Accordingly, the common electrode provided at the left and right sides of the sub-pixel becomes adjacent to the data lines by interposing the gate insulating layer therebetween. As a result, the parasitic capacitances Cdc are generated between the common electrode 124 provided at the left and right sides of the sub-pixel, the adjacent data lines 115, and the gate insulating layer 113 that insulates the common electrode from the adjacent data lines 115.

Figure 9:
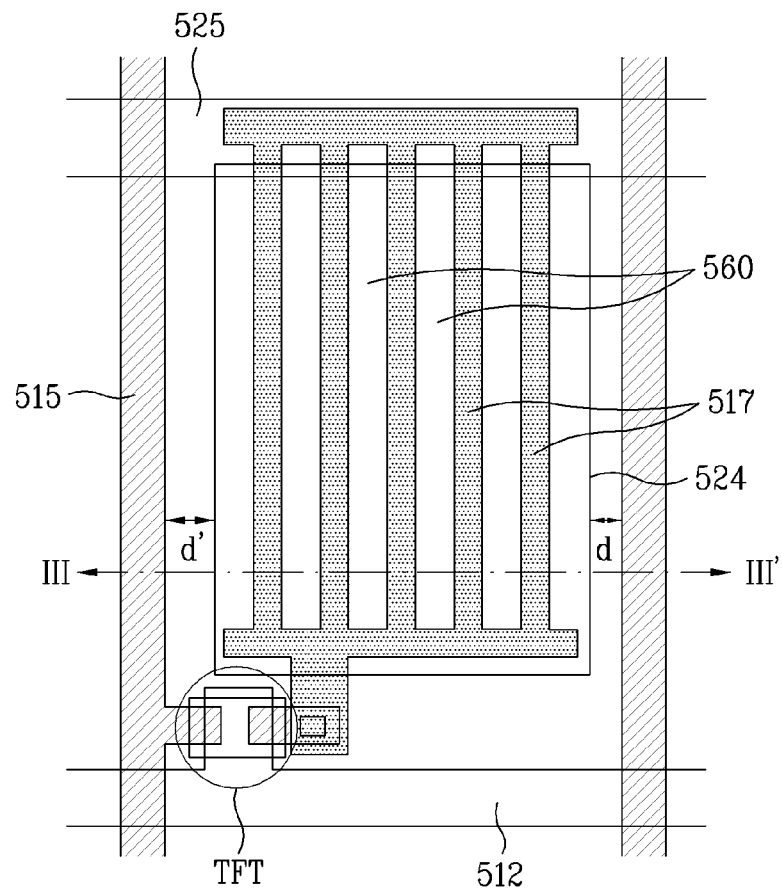
FIG. 9 is a plan view illustrating an FFS mode LCD device according to an embodiment of the invention.
Figure 10:
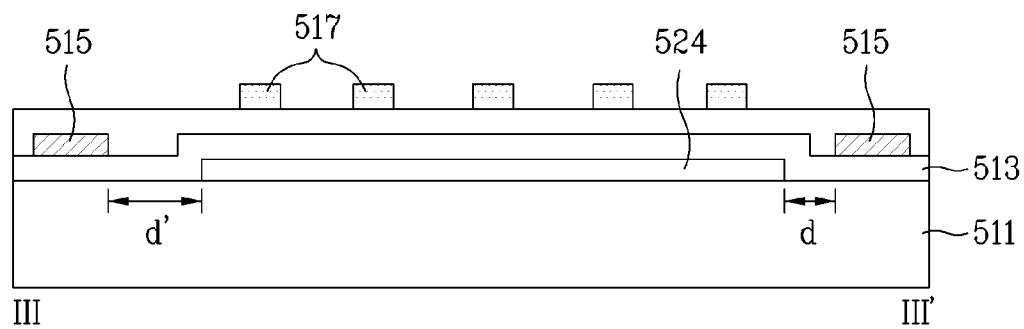
FIG. 10 is a cross-sectional view taken along line III-III' of FIG. 9.

FIG. 9 is a plan view illustrating an FFS mode LCD device according to an embodiment of the invention, and FIG. 10 is a cross-sectional view taken along line III-III' of FIG. 9. As shown in FIGS. 9 and 10, a TFT array substrate 511 of the FFS mode LCD device according to an embodiment of the invention includes gate and data lines 512 and 515 formed of metal, vertically crossing each other to define sub-pixels, TFTs adjacent to crossings of the gate lines 512 and the data lines 515, a single body common electrode 524 formed of a transparent metal inside the sub-pixels, and pixel electrodes 517 connected with the TFTs, overlapping the single body common electrode 524, and having slits 560 having the same shape.

The distances between the data lines arranged at left and right sides of each sub-pixel and the adjacent portions of the single body common electrode are different so as to make parasitic capacitance Cdc at the left and right sides of each sub-pixel different. In other words, the distance D' between the data line 515 arranged at the left side of the sub-pixel and its adjacent common electrode 524 is greater than the distance D between the data line 515 at the right side of the sub-pixel and adjacent portion of the single body common electrode 524. In this case, the parasitic capacitance between the data lines 515 arranged at the right side of the sub-pixel and its adjacent portion of the single body common electrode 524 is greater than the parasitic capacitance between the data lines 515 arranged at the left side of the sub-pixel and its adjacent portion of the single body common electrode 524. By increasing the parasitic capacitance Cdc between the data line 515 arranged at the right side of the sub-pixel and its adjacent portion of the common electrode 524, sufficient offset coupling can be obtained in each sub-pixel such that a data common voltage is not amplified.

The single body common electrode 524 contacts the common line 525 to receive the signal Vcom while the pixel electrode 517 receives a signal Vdata that has passed through the TFT. In this case, a fringe electric field occurs between the common electrode 524 and the pixel electrode 517 through the slit 560. Since a gate insulating layer 513 is interposed between the gate line 512 and the data line 515, the parasitic capacitances Cdc are generated between the common electrode 524 provided at the left and right sides of the sub-pixel, the adjacent data lines 515, and the gate insulating layer 513 that insulates the common electrode 524 from the adjacent data lines 515. Because the distances between the common electrode at the left and right sides of the sub-pixel and the adjacent data lines are different, the parasitic capacitances are different.

Although not shown, each of the IPS mode TFT array substrate and the FFS mode TFT array substrate is bonded to a color filter array substrate with a layer of liquid crystal layer molecules therebetween. The color filter array substrate includes a black matrix formed at the sides of the sub-pixel to prevent light leakage from occurring, and R, G, and B color filter layers formed in the black matrix to display colors.

The respective R, G, and B color filter layers are formed to collectively correspond to the pixels so that each pixel has at least R, G, and B color sub-pixels. Typically, the sub-pixels having R, G, and B colors are driven independently. A color of one pixel is displayed by combination of the R, G, and B sub-pixels.

FIGS. 11A and 11B illustrate driving of a checkerboard pattern according to an embodiment of the invention. In the case where the LCD device is driven in a checkerboard pattern, as shown in FIGS. 11A and 11B, data voltages of positive polarity (+) and negative polarity (−) are applied in a horizontal direction by a dot inversion mode and also the data voltages are applied in a vertical direction by the dot inversion mode. The LCD device is driven so that white (W) and black (B) of the Nth line are opposite to white (W) and black (B) of the N+1th line in a vertical direction. Voltages of a high level with a sequence of positive polarity (+), negative polarity (−), and positive polarity (+) are applied to the R, G, and B sub-pixels by the dot inversion mode so as to display white. On the other hand, either voltages of low level or no voltage are applied to the R, G, and B sub-pixels so as to display black.

The data voltage Vdata is applied by an alternating current (AC) so as to allow the voltages of positive polarity (+) and negative polarity (−), which can be at different levels to display gray scale. Also, the common signal Vcom1 is applied by a direct current (DC) voltage. The layer of liquid crystal molecules is driven by the potential difference between the data voltage on the pixel electrode and the common voltage on the common electrode.

In the case of the R sub-pixel of the Nth line, as shown in FIG. 11A, the parasitic capacitance generated between the common electrode and the left data line that carries the voltage of positive polarity (+) is weaker than the parasitic capacitance generated between the common electrode and the right data line that carries the voltage of negative polarity (−) such that the R sub-pixel maintains an appropriate bias voltage of negative polarity (−). In the case of the G sub-pixel of the Nth line, the parasitic capacitance generated between the common electrode and the left data line that carries a voltage of negative polarity (−) is weaker than the parasitic capacitance generated between the common electrode and the right data line that carries the voltage of positive polarity (+) such that the G sub-pixel maintains an appropriate bias voltage of positive polarity (+). Further, the stronger parasitic capacitance of negative polarity (−) in the R sub-pixel offsets the stronger parasitic capacitance of positive polarity (+) in the G sub-pixel.

In the case of the B sub-pixel of the Nth line, a parasitic capacitance is generated between the common electrode and the left data line that carries the voltage of positive polarity (+) but a coupling is not generated between the common electrode and the right data line where a reference voltage flows. The parasitic capacitance between the common electrode and the left data line is negligible. Accordingly, since the voltage of the common electrode is not amplified in the Nth line, the voltage difference between the common voltage and the data voltage applied to the G sub-pixel becomes the same as the voltage difference between the common voltage and each data voltage applied to the R, B sub-pixels so that the greenish phenomenon does not occur.

In the case of the N+1th line, as shown in FIG. 11B, coupling in the R and G sub-pixels also offset each other and coupling between the left data line applied with the data voltage of negative polarity and its adjacent common electrode in the B sub-pixel remain. But, since a distance between the left data line and its adjacent common electrode is greater than distance between the left data line and its adjacent common electrode in the B sub-pixel, the parasitic capacitance generated between the left data line of the sub-pixel and its adjacent common electrode is negligible, and thus the common voltage is not amplified. As a result, since the common voltage is not shifted, the voltage difference between the common voltage and the data voltage applied to the G sub-pixel becomes the same as the voltage difference between the common voltage and each data voltage applied to the R and B sub-pixels so that the greenish phenomenon does not occur.

While it has been described above that the pixel and common electrodes of the IPS mode LCD device and the pixel electrodes and the slits of the FFS mode LCD device are formed in a vertical direction (data line direction), they can alternatively be formed in a horizontal direction (gate line direction). Also, while embodiments of the invention have been described with regard to an IPS mode LCD device and an FFS mode LCD device, embodiments of the invention are not limited to these types of devices and can be applied to all LCD devices with common electrodes at the sides of the sub-pixel that have a greenish problem due to parasitic capacitance generated between the common electrode and its adjacent data line.

Since the parasitic capacitance between the data lines arranged at the right side of the sub-pixel and its adjacent common electrode becomes greater than the parasitic capacitance between the data lines arranged at the left side of the sub-pixel and its adjacent common electrode, the common voltage can be prevented from being shifted by coupling between the data line and its adjacent common electrode. Accordingly, since the common voltage applied to the G sub-pixel becomes the same common voltage used for the R and B sub-pixels, the greenish phenomenon does not occur. Thus, an accurate color rendering capability is maintained.

It will be apparent to those skilled in the art that various modifications and variations can be made in the liquid crystal display device of embodiments of the invention without departing from the spirit or scope of the invention. Thus, it is intended that embodiments of the invention cover the modifications and variations of this invention provided they come within the scope of the appended claims and their equivalents.

What is claimed is:

1. A liquid crystal display device, comprising:
   gate and data lines on a first substrate, wherein the gate lines cross the data lines to define sub-pixels;
   a thin film transistor adjacent to where the gate lines cross the data lines;
   a pixel electrode connected to the thin film transistor;
   a common electrode in a first sub pixel, wherein a first parasitic capacitance between a first data line arranged at the left side of the first sub-pixel and the common electrode is smaller than a second parasitic capacitance between a second data line arranged at the right side of the first sub-pixel and the common electrode; and
   Wherein the pixel electrode overlaps the common electrode and has a plurality of slits.

2. The liquid crystal display device as claimed in claim 1, wherein the layer of liquid crystal molecules is driven in a fringe field switching mode by a fringe electric field between the pixel electrode and the common electrode.

3. The liquid crystal display device, comprising: as claimed in claim 1,
   wherein the data lines are applied with data voltages in a dot inversion mode.

4. The liquid crystal display device as claimed in claim 1,
   wherein the data lines carry a data voltage of alternating current voltage and the common electrode carry a common voltage of direct current voltage.

5. A liquid crystal display device, comprising:
   gate and data lines on a first substrate to define sub-pixels;
   a thin film transistor adjacent to where the gate lines cross the data lines;
   a pixel electrode connected to the thin film transistor;
   a common electrode in a first sub pixel, wherein a first parasitic capacitance between a first data line arranged at the left side of the first sub-pixel and the common electrode is different from a second parasitic capacitance between a second data line arranged at the right side of the first sub-pixel and the common electrode; and
   a second substrate bonded to the first substrate with a layer of liquid crystal molecules therebetween,
   wherein the pixel electrode overlaps the common electrode and has a plurality of slits.

6. The liquid crystal display device as claimed in claim 5,
   wherein the data lines carry a data voltage of alternating current voltage and the common electrode carry a common voltage of direct current voltage.

* * * * *